(12) United States Patent
Nakai

(10) Patent No.: US 10,852,658 B2
(45) Date of Patent: Dec. 1, 2020

(54) OPTICAL SCANNING DEVICE AND IMAGE FORMING APPARATUS INCLUDING THE OPTICAL SCANNING DEVICE

(71) Applicant: KYOCERA Document Solutions Inc., Osaka (JP)

(72) Inventor: Jun Nakai, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/702,674

(22) Filed: Dec. 4, 2019

(65) Prior Publication Data

US 2020/0183299 A1 Jun. 11, 2020

(30) Foreign Application Priority Data

Dec. 10, 2018 (JP) .................. 2018-230561

(51) Int. Cl.
```
G03G 15/04     (2006.01)
G02B 26/10     (2006.01)
G03G 15/043    (2006.01)
G02B 7/182     (2006.01)
G02B 26/12     (2006.01)
```
(52) U.S. Cl.
CPC ......... *G03G 15/043* (2013.01); *G02B 7/1821* (2013.01); *G02B 26/125* (2013.01); *G03G 15/04036* (2013.01)

(58) Field of Classification Search
CPC ........... G03G 15/04036; G03G 15/043; G02B 26/10; G02B 26/12; G02B 26/125; G02B 7/1821
See application file for complete search history.

(56) References Cited

U.S. PATENT DOCUMENTS

2010/0124435 A1* 5/2010 Uduki .................. G02B 26/125
                                                      399/151
2016/0070196 A1* 3/2016 Park .................. G03G 15/04036
                                                      347/118

FOREIGN PATENT DOCUMENTS

JP    2008180972 A  * 8/2008  ............. G02B 26/12
JP    2015-225100     12/2015

* cited by examiner

Primary Examiner — Sophia S Chen

(74) Attorney, Agent, or Firm — Wenderoth, Lind & Ponack, L.L.P.

(57) ABSTRACT

An optical scanning device has an optical housing. A coupled Helmholtz resonator having a first resonance space and a second resonance space therein is disposed in the optical housing. A translucent partition wall, a first partition wall, and a second partition wall which extend from a bottom wall to a top wall of the optical housing are arranged in this order from an upstream side toward a downstream side on an optical path between a light source and a rotary polygonal mirror. The first and second resonance spaces are separated from each other by the three partition walls. One of the first and second resonance spaces resonates at a frequency of a rotational speed of a motor, and the other of the first and second resonance spaces resonates at a generated frequency of a wind noise generated by the rotary polygonal mirror.

4 Claims, 11 Drawing Sheets

Fig. 7

|  | Design Specifications | Symbol | Value | Unit |
|---|---|---|---|---|
| Resonator 1 | Neck length | $l_1$ | 0.5 | mm |
|  | Neck radius | $r_1$ | 5 | mm |
|  | Resonance cavity height | $h$ | 20 | mm |
|  | Resonance cavity length | $L_{b1}$ | 55.2 | mm |
|  | Resonance cavity width | $L_w$ | 20 | mm |
|  | Opening area | $S_1$ | 78.54 | mm$^2$ |
|  | Resonance cavity volume | $V_1$ | 22080 | mm$^3$ |
|  | Open-end corrected neck length | $l'_1$ | 9 | mm |
| Resonator 2 | Neck length | $l_2$ | 0.5 | mm |
|  | Neck radius | $r_2$ | 5 | mm |
|  | Resonance cavity height | $h$ | 20 | mm |
|  | Resonance cavity bottom length | $L_{b2}$ | 7.39 | mm |
|  | Resonance cavity top length | $L_{t2}$ | 5.64 | mm |
|  | Resonance cavity width | $L_w$ | 20 | mm |
|  | Opening area | $S_2$ | 78.54 | mm$^2$ |
|  | Resonance cavity volume | $V_2$ | 2604.387827 | mm$^3$ |
|  | Open-end corrected neck length | $l'_2$ | 9 | mm |
|  | Cover glass angle | $\theta$ | 5 | deg |

Fig. 9

Related Art

| Number of polygon surfaces | 6 | surfaces |
|---|---|---|
| Rotational speed | 45000 | rpm |
| Rotational noise frequency (f) | 750.0 | Hz |
| Speed of sound (C) | 340290 | mm/sec |
| Neck length (L) | 0.5 | mm |
| Neck radius (r) | 5.0 | mm |
| Neck cross-section area (S) | 78.5 | mm^2 |
| Open-end corrected neck length (L') | 9.0 | mm |
| Resonance cavity volume (V) | 45505.5 | mm^3 |
| Resoance freqneucy (f) | 750.0 | Hz |

Fig. 10

Related Art

| Number of polygon surfaces | 6 | surfaces |
|---|---|---|
| Rotational speed | 45000 | rpm |
| Wind noise frequency (f) | 4500.0 | Hz |
| Speed of sound (C) | 340290 | mm/sec |
| Neck Length (L) | 0.5 | mm |
| Neck Radius (r) | 5.0 | mm |
| Neck cross-section area (S) | 78.5 | mm^2 |
| Open-end corrected neck length (L') | 9.0 | mm |
| Resonance cavity volume (V) | 1264.0 | mm^3 |
| Resoance freqneucy (f) | 4500.0 | Hz |

OPTICAL SCANNING DEVICE AND IMAGE FORMING APPARATUS INCLUDING THE OPTICAL SCANNING DEVICE

CROSS-REFERENCE TO RELATED APPLICATION(S)

This application is based upon and claims the benefit of priority from Japanese Patent Application No. 2018-230561 filed on Dec. 10, 2018, the entire contents of which are incorporated herein by reference.

BACKGROUND

The technology disclosed herein relates to an optical scanning device and an image forming apparatus including the optical scanning device.

An image forming apparatus or the like of electrophotographic type typically includes an optical scanning device which applies a light beam onto a surface of an image carrier. Such an optical scanning device includes a light source emitting a light beam, a rotatory polygonal mirror deflecting and scanning the light beam emitted from the light source, and an optical housing enclosing the rotary polygonal mirror therein. A motor for rotationally driving the rotary polygonal mirror is mounted on a bottom wall of the optical housing. An image forming lens for forming an image of the light beam reflected by the rotary polygonal mirror on the surface of the image carrier is disposed in the optical housing.

The optical scanning device of this type lets a rotational noise generated by the polygon motor itself and a wind noise generated by the polygon mirror leak out of the optical housing. Such noises are likely to be unpleasant for users around the apparatus.

To solve this problem, an optical scanning device has been proposed which has a Helmholtz resonator as a sound absorber arranged above the rotary polygonal mirror. This Helmholtz resonator has a resonance space which resonates at a frequency of sound generated when the rotary polygonal mirror is driven.

SUMMARY

An aspect of the present disclosure provides an optical scanning device including a light source, a rotary polygonal mirror, an optical housing, a motor, an image forming lens, and a Helmholtz resonator. The light source emits a light beam. The rotary polygonal mirror reflects the light beam emitted from the light source to deflect and scan the light beam. The optical housing houses the rotary polygonal mirror therein. The motor is mounted on a bottom wall of the optical housing and drives the rotary polytonal mirror. The image forming lens is housed in the optical housing and forms an image of the light beam reflected by the rotary polygonal mirror. The Helmholtz resonator absorbs a sound caused by rotation of the rotary polygonal mirror.

The Helmholtz resonator is a coupled Helmholtz resonator having a first resonance space and a second resonance space which are arranged in series in the optical housing. A translucent partition wall, a first partition wall, and a second partition wall, which each extend from the bottom wall of the optical housing to a top wall of the optical housing, are arranged in this order from an optical-path upstream side to an optical-path downstream side on an optical path between the light source and the rotary polygonal mirror. The first partition wall and the second partition wall each have a light passage opening formed therein through which the light beam passes. The first partition wall and the second partition wall constitute a part of a wall forming the first resonance space. The translucent partition wall and the first partition wall constitute a part of a wall forming the second resonance space. One of the first and second resonance spaces resonates at a frequency of a rotational speed of the motor, while the other one resonates at a generated frequency of a wind noise generated by the rotary polygonal mirror.

Another aspect of the present disclosure provides an image forming apparatus including the above-described optical scanning device.

BRIEF DESCRIPTION OF THE DRAWINGS

FIG. 7 is a table showing design specification values for a coupled Helmholtz resonator applied to a sound absorption structure of the optical scanning device in the embodiment;

FIG. 9 is a diagram corresponding to FIG. 7 which shows a comparative example is shown;

FIG. 10 is a diagram corresponding to FIG. 7 which shows the comparative example;

DETAILED DESCRIPTION

Hereinafter, example embodiments of the present disclosure will be described in detail on the basis of the drawings. It should be noted that the technology disclosed herein is not limited to the embodiments described below.

Embodiment 1

Figure 1:
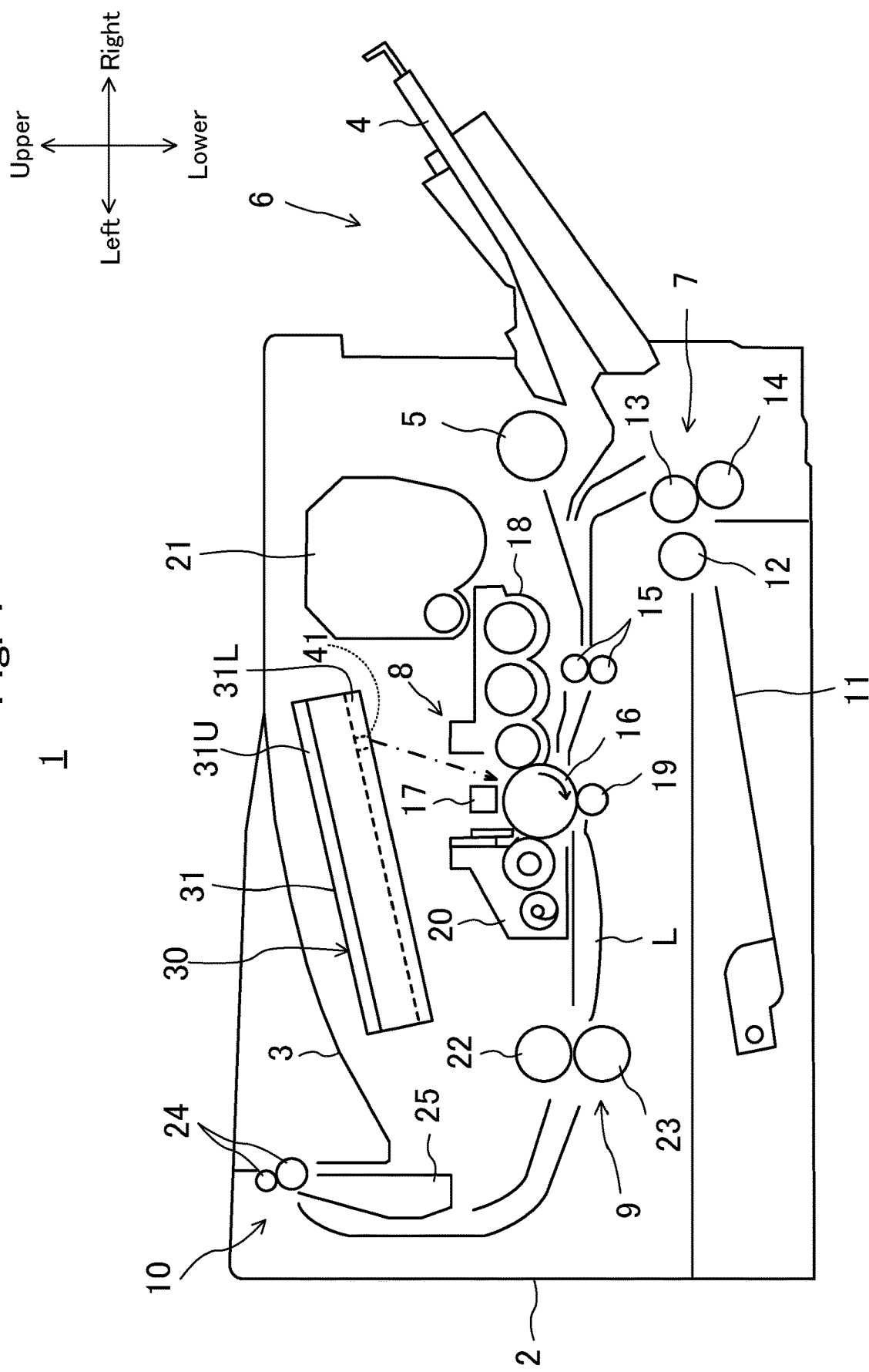
FIG. 1 is a schematic diagram showing an overall configuration of an image forming apparatus including an optical scanning device according to an example embodiment of the present disclosure.

FIG. 1 is a schematic diagram of a configuration of an image forming apparatus 1 including an optical scanning device 30 according to Embodiment 1. The description below describes the image forming apparatus 1 as a laser printer by way of example; however, the image forming apparatus 1 is not limited to a laser printer. The image forming apparatus 1 may be a copying machine, a facsimile, a multifunction peripheral/printer/product (MFP), or the like.

[Overall Configuration]

As shown in FIG. 1, the image forming apparatus 1 includes a box-shaped casing 2, a manual sheet feeding unit 6, a cassette sheet feeding unit 7, an image forming unit 8, a fixing unit 9, and a sheet discharging unit 10. The image forming apparatus 1 is configured to form an image on a sheet on the basis of image data, which is transmitted from a terminal or the like (not shown), while conveying the sheet along a conveyance path L in the casing 2.

The manual sheet feeding unit 6 includes a manual feed tray 4 which is openably and closably provided on one of sides of the casing 2, and a manual sheet feed roller 5 which is rotatably provided in the casing 2.

The cassette sheet feeding unit 7 is disposed at the bottom of the casing 2. The cassette sheet feeding unit 7 includes a sheet feeding cassette 11 storing stacked sheets, a pick-up roller 12 picking up the sheets one by one from the sheet feeding cassette 11, and a feed roller 13 and a separation roller 14 sending the picked-up sheets individually into the conveyance path L.

The image forming unit 8 is disposed above the cassette sheet feeding unit 7 in the casing 2. The image forming unit 8 includes a photosensitive drum 16 as an image carrier rotatably provided in the casing 2, a charger 17, a developing unit 18, a transfer roller 19, a cleaning unit 20, an optical scanning device 30, and a toner hopper 21. The charger 17, the developing unit 18, the transfer roller 19, and the cleaning unit 20 are disposed around the photosensitive drum 16, and the optical scanning device 30 is disposed above the photosensitive drum 16. The image forming unit 8 is configured to form an image on a sheet fed from the manual sheet feeding unit 6 or the cassette sheet feeding unit 7.

Note that a pair of paper stop rollers 15 is disposed on the conveyance path L so as to pause a sheet sent in the conveyance path L and feed the sheet to the image forming unit 8 at a predetermined timing after the pause.

The fixing unit 9 is disposed at one side of the image forming unit 8. The fixing unit 9 includes a fixing roller 22 and a pressure roller 23, which rotate in a state of being pressed against each other. The fixing unit 9 is configured to fix a toner image, which is transferred onto a sheet in the image forming unit 8, on the sheet.

The sheet discharging unit 10 is disposed above the fixing unit 9. The sheet discharging unit 10 includes a sheet exit tray 3, a pair of sheet discharge rollers 24 conveying a sheet to the sheet exit tray 3, and a plurality of guide ribs 25 guiding a sheet to the pair of sheet discharge rollers 24. The sheet exit tray 3 is formed in a concave shape in the top of the casing 2.

Once the image forming apparatus 1 receives image data, the image forming unit 8 rotationally drives the photosensitive drum 16, and the charger 17 electrically charges a surface of the photosensitive drum 16.

A laser beam based on the image data is radiated from the optical scanning device 30 toward the photosensitive drum 16. The laser beam is applied onto the surface of the photosensitive drum 16 so that an electrostatic latent image is formed on the surface of the photosensitive drum 16. The electrostatic latent image formed on the surface of the photosensitive drum 16 is developed by the developing unit 18 so that it is visualized as a toner image.

Thereafter, a sheet passes between the transfer roller 19 and the photosensitive drum 16. During this process, the toner image formed on the surface of the photosensitive drum 16 is transferred onto the sheet. The sheet having the toner image transferred thereon is heated and pressed by the fixing roller 22 and the pressure roller 23 in the fixing unit 9. Thereby, the toner image is fixed on the sheet.

Figure 2:
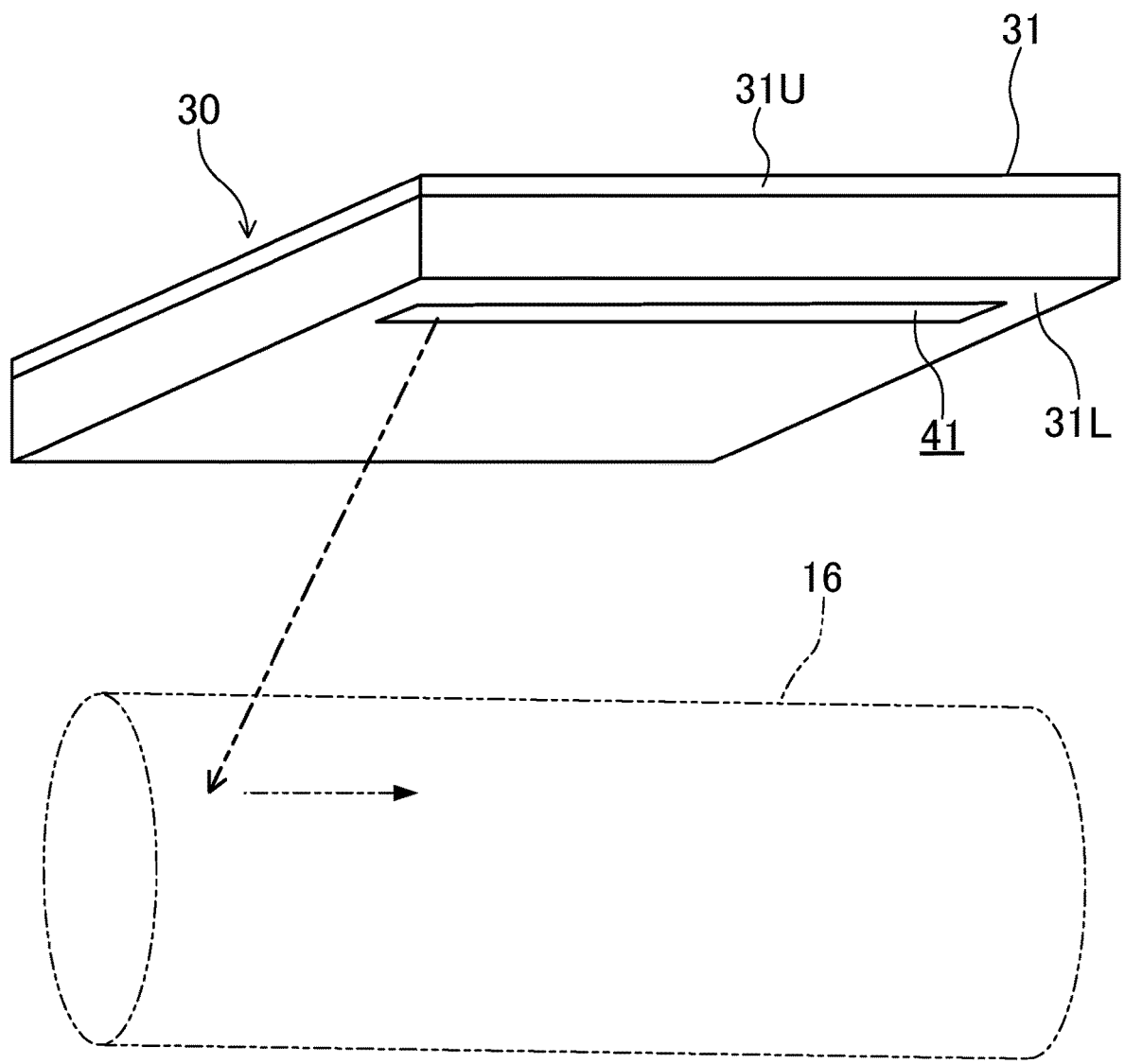
FIG. 2 is a perspective external view of the optical scanning device.

As shown in FIG. 2, the optical scanning device 30 has an optical housing 31. The optical housing 31 is formed in a flat box shape that has a bottom wall 31L, a top wall 31U, and side walls. The optical housing 31 is inclined with respect to the horizontal direction. The bottom wall 31L of the optical housing 31 has an opening 41 formed therein which allows a light beam to be radiated out of the optical housing 31. The opening 41 has an elongated rectangular shape which extends in the back-and-forth direction.

Figure 3:
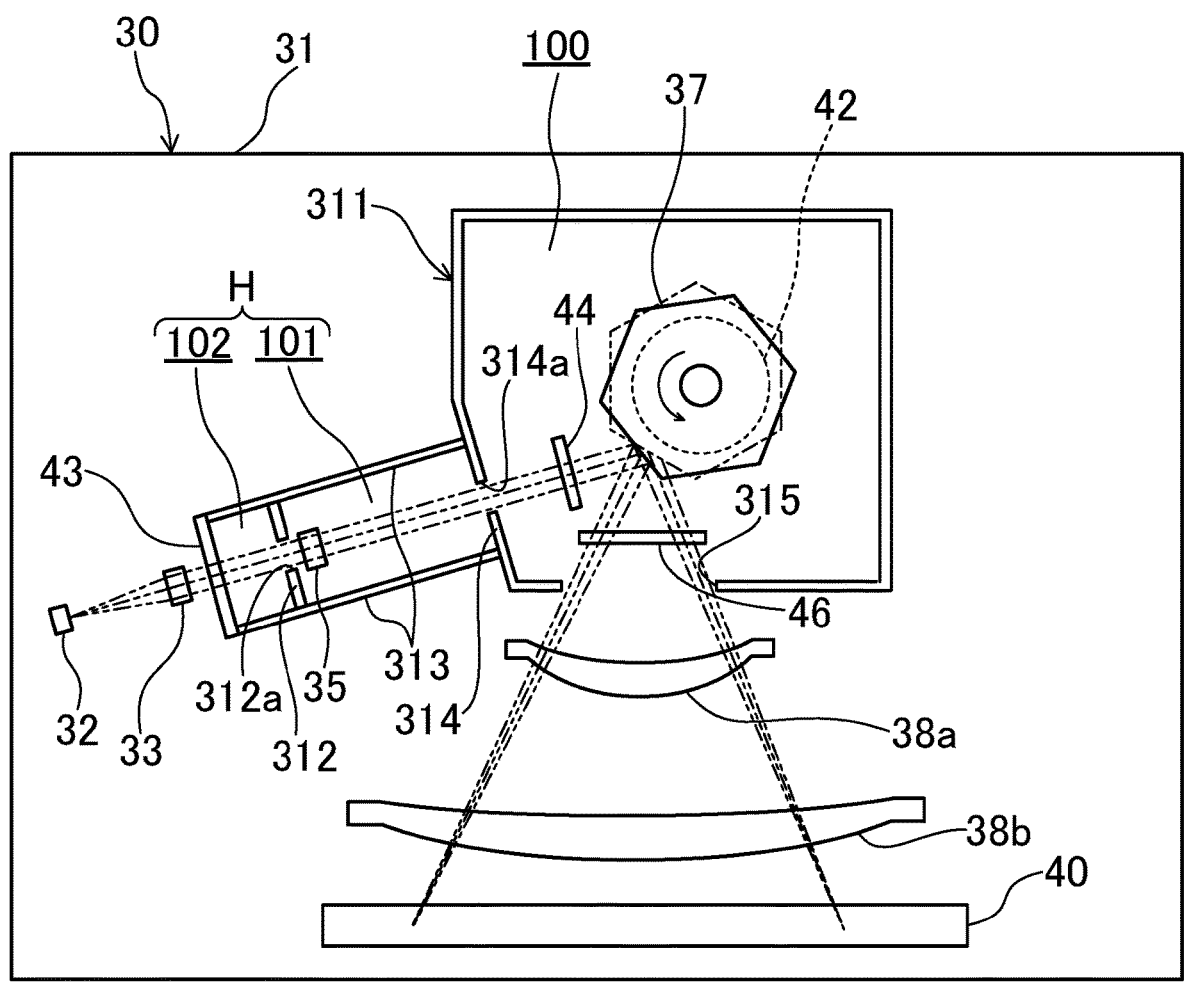
FIG. 3 is a plan view of an internal structure of the optical scanning device.

As shown in FIG. 3, the optical housing 31 encloses a polygon mirror (rotary polygonal mirror) 37, a first image forming lens 38a, a second image forming lens 38b, and a reflective mirror 40.

The polygon mirror 37 is a polygonal mirror having peripheral side surfaces composed of reflective surfaces. The polygon mirror 37 is fixed to a rotary shaft of a polygon motor 42. The polygon motor 42 is mounted on the bottom wall 31L of the optical housing 31.

The first image forming lens 38a and the second image forming lens 38b are disposed at a side of the polygon mirror 37 in the optical housing 31. The first image forming lens 38a and the second image forming lens 38b are arranged side by side with a distance between them in a radial direction of the polygon mirror 37. Each image forming lens 38a, 38b is composed of, for example, an fθ lens.

A light source 32 is disposed near a side wall of the optical housing 31. The light source 32 is, for example, a laser beam source having a laser diode. The light source 32 emits a laser beam (light beam) toward the polygon mirror 37.

A transparent plate (translucent partition wall) 43, a collimator lens 33, a first aperture forming member (first partition wall) 312, a cylindrical lens 35, and a second aperture forming member (second partition wall) 314 are arranged in this order from an optical-path upstream side toward an optical-path downstream side between the light source 32 and the polygon mirror 37.

The reflective mirror 40 is disposed outside the first and second image forming lenses 38a and 38b in the radial direction in the optical housing 31. The reflective mirror 40 has an elongated shape that extends parallel to the first and second image forming lenses 38a and 38b.

In the optical scanning device 30 having the above-described configuration, a laser beam emitted from the light source 32 first passes through the collimator lens 33 so that the laser beam is collimated. The collimated light beam passes through the first aperture forming member 312 so that a cross section of the light beam is adjusted to have a predetermined width in a sub-scanning direction. The light beam having passed through the first aperture forming member 312 is focused on a reflective surface of the polygon mirror 37 by the cylindrical lens 35. In the course of this beam focusing, the light beam passes through the second aperture forming member 314 so that the cross section of the light beam is adjusted to have a predetermined dimension in a main-scanning direction.

The light beam focused on the polygon mirror 37 is reflected by the reflecting surface of the polygon mirror 37 and passes, as a scanning light, through the first image forming lens 38a and the second image forming lens 38b in sequence.

The scanning light having passed through the second image forming lens 38b is reflected by the reflective mirror 40 and radiated out of the optical housing 31 through the opening 41 (see FIG. 2). The light beam radiated out through the opening 41 forms an image on the surface of the photosensitive drum 16 and scans the surface of the photosensitive drum 16 in the main-scanning direction. Rotation of the polygon mirror 37 causes the scanning light having the image on the surface of the photosensitive drum 16 to scan the surface of the photosensitive drum 16 in the main-scanning direction, while rotation of the photosensitive drum 16 causes the scanning light to scan the surface of the photosensitive drum 16 in the sub-scanning direction. Thereby, an electrostatic latent image is formed on the surface of the photosensitive drum 16.

[Rotational Noise and Wind Noise]

Note that sound is generated in the optical scanning device 30 when the polygon mirror 37 is driven by the polygon motor 42. The sound includes a rotational noise generated by the polygon motor 42 and a wind noise generated by the polygon mirror 37.

The rotational noise generated by the polygon motor 42 is caused by a rotational friction at a bearing of the polygon motor 42, etc., and has a frequency equal to a rotational frequency of the polygon motor 42. The wind noise generated by the polygon mirror 37 is caused by a flow of air induced by rotation of the polygon mirror 37.

The wind noise has a frequency equal to a rotational frequency of the polygon mirror 37 (i.e., the rotational frequency of the polygon motor 42) multiplied by the number of reflective surfaces of the polygon mirror 37. The rotational noise and the wind noise are likely to be unpleasant to users as they leak out of the optical housing 31.

Therefore, the optical scanning device 30 in this embodiment is configured to have a sound absorption structure therein which utilizes the principles of a Helmholtz resonator H. This sound absorption structure is incorporated in an incidence optical system of the optical scanning device 30 to absorb the above-described rotational noise and wind noise.

[Sound Absorption Structure of Optical Scanning Device]

Here, the incidence optical system of the optical scanning device 30 including the above-described sound absorption structure is described in detail with reference to FIGS. 3 and 4.

As shown in FIG. 3, the optical scanning device 30 has a ring-shaped partition wall 311 in the optical housing 31, which surrounds the polygon mirror 37. The polygon mirror 37 and the polygon motor 42 are enclosed in a space 100 inside the ring-shaped partition wall 311. The ring-shaped partition wall 311 is formed to extend from the bottom wall 31L to the top wall 31U of the optical housing 31.

The ring-shaped partition wall 311 has formed therein an incoming opening 314a through which a light beam directed from the light source 32 toward the polygon mirror 37 passes, and an outgoing opening 315 through which a light beam (scanning light) reflected by the polygon mirror 37 passes. The incoming opening 314a is formed by an opening 314a of the second aperture forming member 314 that regulates the width in the main-scanning direction of the light beam.

A first wind blocking plate 44 is disposed at a partition-wall-interior side of the incoming opening 314a, and a second wind blocking plate 46 is disposed at a partition-wall-interior side of the outgoing opening 315. The first wind blocking plate 44 and the second wind blocking plate 46 are arranged so as to block a flow of air induced by rotation of the polygon mirror 37. This configuration prevents a flow of air induced by rotation of the polygon mirror 37 from being blown directly into the incoming opening 314a and the outgoing opening 315 so as to prevent generation of a whistle noise.

As shown in FIG. 3, a first resonance space 101 for absorbing the rotational noise generated by the polygon motor 42 and a second resonance space 102 for absorbing the wind sound generated by the polygon mirror 37 are provided at a partition-wall-exterior side of the incoming opening 314a. The first resonance space 101 and the second resonance space 102 are arranged in series along the optical path extending from the light source 32 to the polygon mirror 37.

On the optical path, as described above, the transparent plate 43, the first aperture forming member 312, and the second aperture forming member 314 are arranged in this order from the optical-path upstream side toward the optical-path downstream side. Further, opposed walls 313 are respectively disposed at two width-directional sides of this optical path.

The first aperture forming member 312 has an opening 312a (light passage opening) for regulating a sub-scanning width of a light beam emitted from the light source 32. The second aperture forming member 314 has an opening 314a (light passage opening) for regulating a main-scanning width of the light beam.

Figure 4:
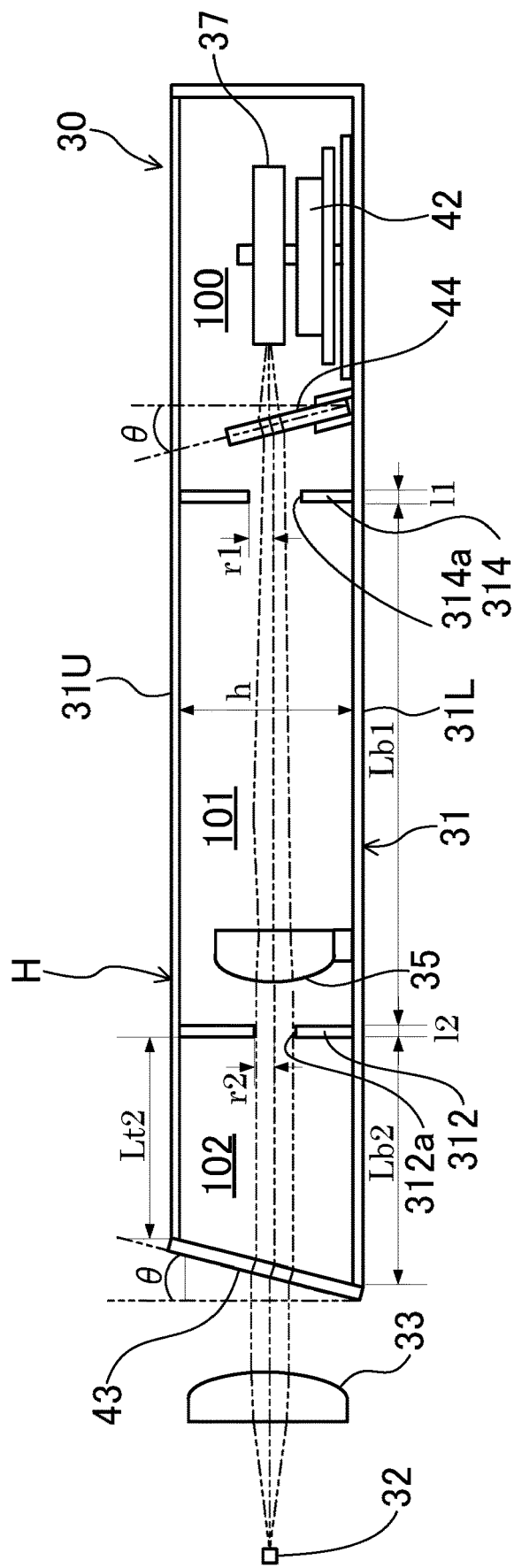
FIG. 4 shows a sub-scanning cross section taken along the center of a light beam directed from a light source to a polygon mirror.

As shown in FIG. 4, the first aperture forming member 312 extends from the bottom wall 31L to the top wall 31U of the optical housing 31. The first aperture forming member 312 is formed integrally with bottom wall 31L of the optical housing 31.

The second aperture forming member 314 also extends from the bottom wall 31L to the top wall 31U of the optical housing 31. The second aperture forming member 314 constitutes a part of the ring-shaped partition wall 311 and is formed integrally with the bottom wall 31L of the optical housing 31.

The first resonance space 101 is surrounded by the first aperture forming member 312, the second aperture forming member 314, and the opposed walls 313 in plan view. Height-directional sides of the first resonance space 101 are respectively formed by the bottom wall 31L and the top wall 31U of the optical housing 31. The cylindrical lens 35 is disposed at an upstream side end of the optical path in the first resonance space 101.

The second resonance space 102 is surrounded by the transparent plate 43, the first aperture forming member 312, and the opposed walls 313 in plan view. Height-directional sides of the second resonance space 102 are respectively formed by the bottom wall 31L and the top wall 31U of the optical housing 31. No optical element is provided in the second resonance space 102.

The transparent plate 43 that covers the light source 32 side of the second resonance space 102 is composed of a plate which is transparent to a light beam, such as a glass plate. The transparent plate 43 is inclined to the optical-path downstream side (the cylindrical lens 35 side) from the bottom wall 31L side toward the top wall 31U side. The angle of inclination θ of the transparent plate 43 is equal to an angle of inclination θ of the first wind blocking plate 44.

[Configuration of First Wind Blocking Plate 44]

As shown in FIG. 4, the first wind blocking plate 44 is inclined at a predetermined angle θ outwardly in the radial direction of the polygon mirror 37 from the bottom wall 31L side toward the top wall side 31U. A lower end of the first wind blocking plate 44 is fitted between and supported by a pair of clamping plates 31b provided on the bottom wall of the optical housing 31.

Here, the reason why the first wind blocking plate 44 is inclined at a predetermined angle θ is described. In the case where the first wind blocking plate 44 is not inclined (i.e., in the case where the predetermined angle θ is 0°), a light beam guided to the first wind blocking plate 44 from the light source 32 is reflected by a light incident surface of the first wind blocking plate 44 and returned to the light source 32. The returned light beam is reflected and enters a light-quantity detection sensor (e.g., a photo sensor) provided in the light source 32. The light beam entering the photo sensor causes reduction of accuracy of light quantity adjustment in the light source 32. Further, a light beam reflected by the polygon mirror 37 is reflected again by a light outgoing surface of the first wind blocking plate 44, whereby a stray light is generated. The stray light passes through the first and second image forming lenses 38a and 38b and reaches the surface of the photosensitive drum 16, which causes a defective image, such as an image with uneven density. To prevent these problems, the first wind blocking plate 44 is inclined at a predetermined angle θ.

Note that the transparent plate 43 that covers the light source 32 side of the second resonance space 102 is inclined at an angle equal to the angle of inclination θ of the first wind blocking plate 44 but in the direction opposite to the direction of inclination of the first wind blocking plate 44.

This inclination of the transparent plate 43 prevents a light beam from being reflected by the transparent plate 43 and re-entering the polygon mirror 37, and also enables adjustment of light beam height. The adjustment of light beam height means that, because a light beam is supposed to be refracted to the top wall 31U side when passing through the first wind blocking plate 44, a light beam is refracted in advance to the bottom wall 31U side by an amount equal to the supposed amount of refraction. This adjustment ensures that a light beam emitted from the light source 32 is guided to a reflective surface of the polygon mirror 37.

[Configuration of Second Wind Blocking Plate 46]

Similarly to the first wind blocking plate 44, the second wind blocking plate 46 (illustrated only in FIG. 3) is inclined at a predetermined angle outwardly in the radial direction of the polygon mirror 37 (to the first image forming lens 38a side) from the bottom wall 31L side toward the top wall 31U side. A lower end of the second wind blocking plate 46 is fitted between and supported by a pair of clamping plates (not illustrated) provided on the bottom wall of the optical housing 31.

Note that, in the case where the second wind blocking plate 46 is not inclined (i.e., in the case where the predetermined angle θ is 0°), a light beam reflected by the polygon mirror 37 is reflected by a light incident surface of the second wind blocking plate 46 and returned to the polygon mirror 37. The returned light beam is reflected again by the polygon mirror 37, whereby a stray light is generated. The stray light passes through the first and second image forming lenses 38a and 38b and reaches the surface of the photosensitive drum 16, which causes a defective image, such as an image with uneven density. To prevent these problems, the second wind blocking plate 46 is inclined at a predetermined angle θ so that the reflected light beam does not re-enter the polygon mirror 37.

[General Principles of Coupled Helmholtz Resonator]

Next, the principles of a resonator applied to the sound absorption structure of the optical scanning device 30 in this embodiment are described with reference to FIGS. 5 and 6. This resonator is a coupled Helmholtz resonator having two Helmholtz resonators A and B coupled in series. Each resonator A, B has a resonance space a1, b1. As for the front resonator A, reference numeral l1 represents the length of a neck a2, reference numeral r1 represents the inner radius of the neck a2, and V1 represents the volume of the resonance space a1. As for the rear resonator B, reference numeral l2 represents the length of a neck b2, reference numeral r2 represents the inner radius of the neck b2, and V2 represents the volume of the resonance space b1. When an acoustic wave enters an opening of the first resonator A, air inside the necks a2 and b2 vibrate due to resonance and the kinetic energy of the air inside the necks a2 and b2 is lost due to friction between the air and inner walls of the necks a2 and b2, whereby the sound is absorbed.

Here, a peak sound absorption frequency of this resonator is calculated. To this end, first of all, an acoustic impedance of an acoustic system is calculated. The acoustic impedance represents sound propagation difficulty that is shown when the acoustic system is modeled as a circuit on the basis of analogy with an electric circuit. Voltage, Current, and impedance in an alternating-current electric circuit correspond to sound pressure, volume velocity, and acoustic impedance in an acoustic circuit, respectively.

Figure 6:
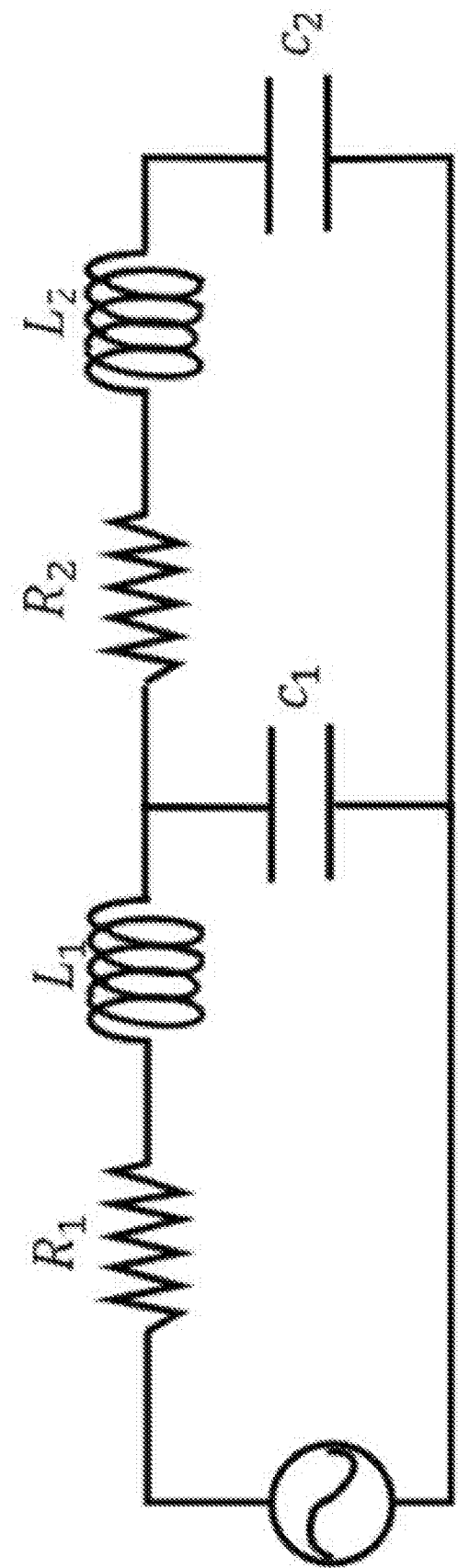
FIG. 6 is a diagram of an electrically equivalent circuit of the Helmholtz resonator illustrated in FIG. 5.

FIG. 6 shows a modeled acoustic circuit. Reference numeral R1, R2 respectively represents acoustic resistance of the neck a2, b2. Reference numeral L1, L2 respectively represents so-called inertance of the neck a2, b2, which corresponds to inductance in an electric circuit. Reference numeral C1, C2 respectively represents so-called acoustic compliance of the volume V1, V2, which corresponds to capacitance in an electric circuit. Note that total acoustic impedance of an acoustic system can be calculated easily in the same way as impedance of an alternating-current electric circuit.

$$Z(\omega) = R_1 + j\omega L_1 + \left( \frac{\left(R_2 + j\omega L_2 - \frac{j}{\omega C_1}\right)\left(-\frac{j}{\omega C_2}\right)}{R_2 + j\omega L_2 - \frac{j}{\omega C_1} - \frac{j}{\omega C_2}} \right) \quad \text{[Equation 1]}$$

In Equation 1, ω is an angular frequency of sound input into a resonator, and j is an imaginary unit. Equation 1 can be separated into a real part $Z_{ye}(\omega)$ and an imaginary part $Z_{jm}(\omega)$ as shown in Equations 2 and 3 below.

$$Z_{re}(\omega) = R_1 + \frac{R_2}{C_2^2 \omega^2 \left(R_2^2 + \frac{(C_1 + C_2 - C_1 C_2 L_2 \omega^2)^2}{C_1^2 C_2^2 \omega^2}\right)} \quad \text{[Equation 2]}$$

$$Z_{im}(\omega) = \frac{\begin{array}{l}(-C_1 - C_2 + (C_2^2 L_1 + 2C_1 C_2 (L_1 + L_2) + \\ C_1^2 (L_1 + L_2 - C_2 R_2^2))\omega^2 + \\ C_1 C_2 (-L_2 (2(C_1 + C_2) L_1 + C_1 L_2) + \\ C_1 C_2 L_1 R_2^2)\omega^4 + C_1^2 C_2^2 L_1 L_2^2 \omega^6)\end{array}}{\begin{array}{l}((C_1 + C_2)^2 \omega + C_1 C_2 (-2(C_1 + C_2) L_2 + \\ C_1 C_2 R_2^2)\omega^3 + C_1^2 C_2^2 L_2^2 \omega^5)\end{array}} \quad \text{[Equation 3]}$$

Equation 3 represents the imaginary part of the acoustic impedance; therefore, ω which provides 0 for Equation 3 is a resonance frequency. In the case where a plane wave enters the resonator from air, sound absorption coefficient α is represented by Equation 4 below using $Z1=\rho c$ and the real part and imaginary part of the acoustic impedance.

$$\alpha(\omega) = 1 - \left|\frac{Z(\omega) - Z_1}{Z(\omega) + Z_1}\right|^2 = \frac{4\rho c Z_{re}}{(Z_{re}(\omega) + \rho c)^2 + (Z_{im}(\omega))^2} \quad \text{[Equation 4]}$$

In Equation 4, ρ is a volume density of air and c is a speed of sound. The sound absorption coefficient α is largest at a frequency which provides a maximal value for Equation 4.

The numerator in Equation 3 is a sixth degree equation for ω; therefore, a multi-degree-of-freedom Helmholtz resonator has two or more resonae frequencies.

Appropriately setting R1, R2, L1, L2, C1, and C2 so that the two or more resonance frequencies contain the frequency of the rotational speed of the polygon motor 42 and the frequency of the wind noise generated by the polygon mirror 37 (the rotational frequency of the polygon motor 42 multiplied by the number of surfaces of the polygon mirror 37) enables absorption of both the rotational noise and the wind noise.

R1, R2, L1, L2, C1, and C2 for the structure of the resonator can be calculated in accordance with Equations 5 to 10 below.

$$R_1 = \frac{8\eta l'_1}{\pi r_1^4} \quad \text{[Equation 5]}$$

$$R_2 = \frac{8\eta l'_2}{\pi r_2^4} \quad \text{[Equation 6]}$$

$$L_1 = \frac{\rho l'_1}{\pi r_1^2} \quad \text{[Equation 7]}$$

$$L_2 = \frac{\rho l'_2}{\pi r_2^2} \quad \text{[Equation 8]}$$

$$C_1 = \frac{V_1}{\rho c^2} \quad \text{[Equation 9]}$$

$$C_2 = \frac{V_2}{\rho c^2} \quad \text{[Equation 10]}$$

In Equations 5 to 10, η is a viscosity coefficient of air. R1, R2 is respectively an acoustic resistance of the neck a2, b2 illustrated in FIG. 5, which is derived on the basis of the Hagen-Poiseuille law. L1, L2 is respectively an inertance of the neck a2, b2, which is obtained from the equation of motion for air inside the neck a2, b2 on the basis of analogy with an electric circuit. C1, C2 is respectively an acoustic compliance of the resonance space a1, b1, which is derived from the equation of adiabatic change of gas.

The sound absorption coefficient in Equation 4 can be calculated by substituting Equations 5 to 10 in Equations 2, 3, and 4.

The neck lengths in Equations 5 and 6 are represented by l'1 and l'2 instead of l1 and l2, respectively. This is because, strictly speaking, motion of air in each neck a2, b2 is not limited to the area corresponding to the length of the neck l1, l2 but spreads slightly out of the end of the neck l1, l2; therefore, it is necessary to add an open-end correction value to the length of each neck l1, l2. The corrected lengths of the necks a2 and b2 can be calculated in accordance with Equations 11 and 12 below, respectively.

$$l'_1 = l_1 + \delta_1 \quad \text{[Equation 11]}$$

$$l'_2 = l_2 + \delta_2 \quad \text{[Equation 12]}$$

In Equations 11 and 12, δ1 and δ2 are each an open-end correction value. Note that the open-end correction value can be calculated by various methods and the method used is determined by the shape of the opening.

The open-end correction value for a typical Helmholtz resonator calculated in accordance with Equation 13 below, wherein the open-end correction value is equal to the radius r of the neck a2, b2 multiplied by 0.6.

$$\delta = 0.6r \quad \text{[Equation 13]}$$

In the case of a Helmholtz resonator having a flanged opening, the open-end correction value is calculated in accordance with Equation 14 below, wherein the open-end correction value is equal to the radius r of the neck a2, b2 multiplied by 1.7.

$$\delta = 1.7r \quad \text{[Equation 14]}$$

In the case of a Helmholtz resonator having a non-circular opening, the open-end correction value is calculated in accordance with Equation 15 below where S is an area of the opening.

$$\delta = \sqrt{S} \quad \text{[Equation 15]}$$

Otherwise than using Equations 13 to 15 above, the open-end correction value δ is in some cases determined by actual experiment or the like for use in calculation.

[Correspondence Between Sound Absorption Structure in this Embodiment and Generalized Coupled Helmholtz Resonator]

Figure 5:
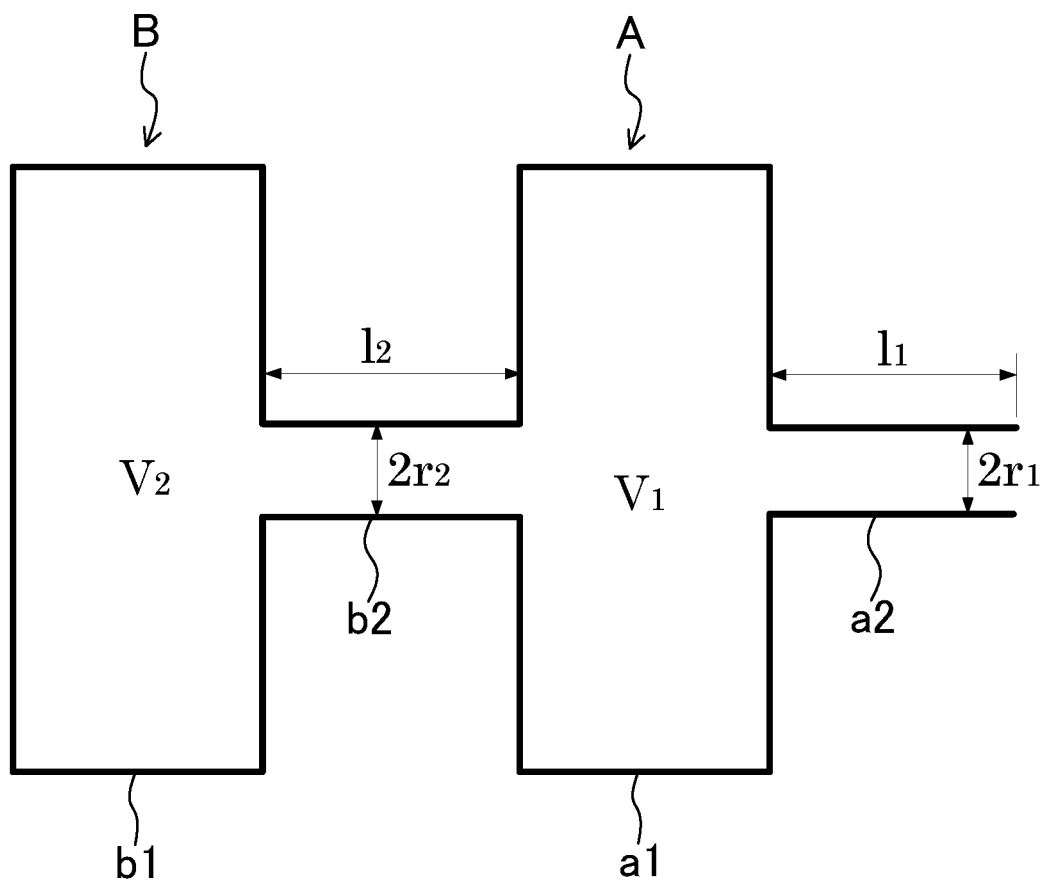
FIG. 5 is a diagram illustrative of the principles of a coupled Helmholtz resonator.

Next, a correspondence between the sound absorption structure of the optical scanning device 30 in this embodiment and the coupled Helmholtz resonator illustrated in FIG. 5 is described with reference to FIGS. 4 and 5.

In the sound absorption structure of the optical scanning device 30, the first resonance space 101 (see FIG. 4) corresponds to the resonance space a1 of the front resonator A of the coupled Helmholtz resonator illustrated in FIG. 5 and the second resonance space 102 corresponds to the resonance space b1 of the rear resonator B of the coupled Helmholtz resonator illustrated in FIG. 5.

Further, the opening 312a of the first aperture forming member 312 of the optical scanning device 30 corresponds to the opening of the neck b2 of the second resonator B of the coupled Helmholtz resonator illustrated in FIG. 5, and the opening 314a of the second aperture forming member 314 (see FIG. 4) corresponds to the opening of the neck a2 of the first resonator A of the coupled Helmholtz resonator illustrated in FIG. 5.

In this embodiment, the resonance frequency of the first resonance space 101 is set to the frequency of the rotational noise generated by the polygon motor 42 and the resonance frequency of the second resonance space 102 is set to the frequency of the wind noise generated by the polygon mirror 37, so that the noises are absorbed. The resonance frequency of each resonance space 101, 102 can be adjusted by changing the volume of the resonance space 101, 102, the area of the opening 312a, 314a of the aperture forming member 312, 314, and the open-end correction value δ.

The radius r2 of the opening 312a of the first aperture forming member 312 is determined by a beam spot diameter in the sub-scanning direction desired on the surface of the photosensitive drum 16, and the radius r1 of the opening 314a of the second aperture forming member 314 is determined by a beam spot diameter in the main-scanning direction desired on the surface of the photosensitive drum 16. Therefore, adjustment of the areas of the openings 312a and 314a of the first and second aperture forming members 312 and 314 is limited. Accordingly, in this embodiment, the volume of each resonance space 101, 102 is mainly adjusted to make the resonance frequency of the resonance space 101, 102 equal to a target frequency. Herein, the term "equal" used with respect to frequencies includes not only the case of being exactly equal but also the case of being substantially equal, for example, the case where there is an error of 5% or less between frequencies.

In the case where the opening 312a of the first aperture forming member 312 and the opening 314a of the second aperture forming member 314 are formed to have a rectangular shape, the resonance frequency of each resonance space 101, 102 can be adjusted by adjusting the area of the opening 312a, 314a. That is to say, for example, because the opening 314a of the second aperture forming member 314 does not regulate the width in the sub-scanning direction of a light beam to be regulated, a beam diameter in the sub-scanning direction on the image of the light beam is not changed even when an opening height of the opening 314a is changed. Therefore, the resonance frequency of the first resonance space 101 can be adjusted by changing the opening height of the opening 314a of the second aperture forming member 314, without affecting the beam diameter in the sub-scanning direction. However, the opening height of the opening 314a of the second aperture forming member 314 needs to be larger than a target beam width in the sub-scanning direction for the light beam to be regulated. Similarly, because the opening 312a of the first aperture forming member 312 does not regulate the width in the main-scanning direction of a light beam to be regulated, a beam diameter in the main-scanning direction on the image of the light beam is not changed even when an opening width of the opening 312a is changed. Therefore, the resonance frequency of the second resonance space 102 can be adjusted by changing the width in the main-scanning direction of the opening 312a of the first aperture forming member 312, without affecting the beam diameter in the main-scanning direction. However, the opening width in the main-scanning direction of the opening 312a of the first aperture forming member 312 needs to be larger than an opening width in the main-scanning direction of the opening 314a of the second aperture forming member 314.

Note that, in the sound absorption structure of the optical scanning device 30 in this embodiment, air inside the part corresponding to each neck of the coupled Helmholtz resonator (i.e., air inside the opening 312a, 314a of each aperture forming member 312, 314) vibrates and a light beam passes through the vibrating air. However, an audible sound like the rotational noise generated by the polygon motor 42 has a sound pressure of approximately 20 [Pa]. In the case of such a small sound pressure, change in refractive index of air can be mostly ignored and the acousto-optic effect also can be ignored.

The reasons therefor are described below.

When a noise is generated, a relation between the refractive index of air η and the sound pressure of the noise ρ is represented by Equation 16 below.

$$n = (n_0 - 1)\left(1 + \frac{P}{P_0}\right)^{1/\gamma} + 1 \quad [\text{Equation 16}]$$

In Equation 16, ηo, Po, and γ are respectively the refractive index at the sound pressure of 0, the atmospheric pressure, and the heat capacity ratio of air. When P=101325 [Pa], P/Po<<1 is established and Equation 16 can therefore be Taylor expanded. When the terms up to the first degree are taken into account and ηo=1.00028 and γ=1.4, the refractive index η is represented by Equation 17 below.

$$n = n_0 + \frac{(n_0 - 1)}{\gamma P_0}P = 1.00028 + 1.9668 \times 10^{-9}P \quad [\text{Equation 17}]$$

Taking into account the fact that an audible sound has a sound pressure of approximately 20 [Pa], it is found that there is little change in the refractive index. Further, because the direction in which air inside each opening vibrates is almost coincident with the direction in which the light beam passing through the opening moves, it is conceivable that the influence of the acousto-optic effect is further reduced.

[Operational Effects]

As described above, the optical scanning device 30 in this embodiment has a coupled Helmholtz resonator H constituted by the first resonance space 101 and the second resonance space 102 arranged along the incidence optical path leading to the polygon mirror 37.

This configuration enables reduction of total resonance space volume needed for absorption of the rotational noise generated by the polygon motor 42 and the wind noise generated by the polygon mirror 37, as compared with the case where two single-type Helmholtz resonators are provided.

Further, the optical scanning device 30 in this embodiment uses the first aperture forming member 312 and the second aperture forming member 314 as partition walls for separating the first resonance space 101 and the second resonance space 102. Therefore, parts can be shared and the whole apparatus can therefore be downsized.

Further, since the resonance frequency of the first resonance space 101 is made set to the frequency of the rotational noise generated by the polygon motor 42 and the resonance frequency of the second resonance space 102 is set to the frequency of the wind noise generated by the polygon mirror 37, two kinds of noises are absorbed by the resonance spaces 101 and 102 that are arranged on one optical path. Therefore, for example, as compared with the case where the first resonance space 101 is arranged on the incidence optical path leading to the polygon mirror 37 and the second resonance space 102 is arranged on a scanning optical path (optical path after reflection), two kinds of noises are more reliably absorbed with a compact configuration.

Further, the optical scanning device 30 in this embodiment has the wind blocking plate 44, which is transparent and blocks a flow of air induced by rotation of the polygon mirror 37, provided between the polygon mirror 37 and the second aperture forming member 314. The wind blocking plate 44 is inclined at a predetermined angle θ outwardly in the radial direction of the polygon mirror 37 from the bottom wall 31L side toward the top wall 31U side. Further, the transparent plate 43, which is arranged to face the second aperture forming member 314, is inclined at an angle equal to the angle at which the wind blocking plate 44 is inclined but in the direction opposite to the direction in which the wind blocking plate 44 is inclined.

This configuration prevents a flow of air induced by rotation of the polygon mirror 37 from being blown directly into the opening 314a of the second aperture forming member 314 so as to prevent generation of a whistle noise and enables the adjustment of light beam height.

Example

An example actual design of this embodiment is described below.

By way of example, the case is considered where the polygon mirror 37 has six reflective surfaces and the rotational speed of the polygon motor 42 is 45000 [rpm]. In this case, the frequency of the rotational noise is 750 [Hz] and the frequency of the wind noise is 4500 [Hz].

FIG. 7 is a table showing values for design specifications of the coupled Helmholtz resonator H incorporated in the incidence optical path illustrated in FIG. 4. The symbols in the table correspond to the dimension symbols in FIG. 4.

Specifically, the opening 314a of the second aperture forming member 314 has a circular shape, and has a radius r1 and a thickness l1. The opening 312 of the first aperture forming member 312 has a circular shape, and has a radius r2 and a thickness l2. The first resonance space 101 and the second resonance space 102 have a height h. The first resonance space 101 has a bottom length Lb1 and a top length Lb1, while the second resonance space 102 has a bottom length Lb2 and a top length Lt2. Their dimension in the optical-path width direction (the length in the direction vertical to the surface of the drawing sheet containing FIG. 4) is represented by Lw.

These specification values are instituted in Equations 5 to 10 to calculate R1, R2, L1, L2, C1, and C2. Subsequently, $\alpha(\omega)$ in Equation 4 is calculated based on Equations 2 and 3.

Further, the open-end correction value is calculated in accordance with Equation 14.

Figure 8:
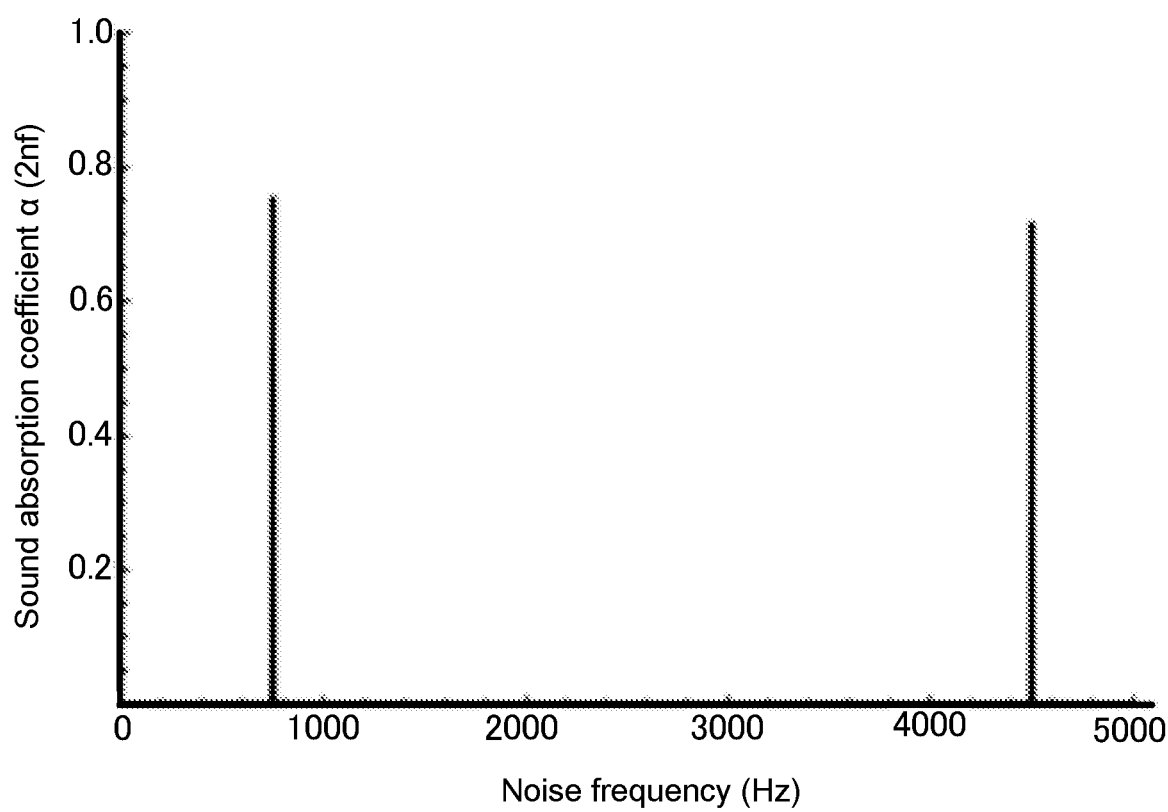
FIG. 8 is a graph showing sound absorption coefficient of the sound absorption structure of the optical scanning device in the embodiment.

FIG. 8 is a graph showing the sound absorption coefficient $\alpha(2\pi f)$ calculated based on the specification values shown in FIG. 7. The horizontal axis of the graph represents the frequency f [Hz] of the rotational noise generated by the polygon motor 42 and the vertical axis represents the sound absorption coefficient $\alpha(2\pi f)$.

This graph shows that a peak (maximal value) of the sound absorption coefficient $\alpha$ is shown at the frequency f=750.04 [Hz] and at the frequency f=4500.38 [Hz]. The frequency f=750.04 [Hz] is substantially equal to the frequency of the rotational noise generated by the polygon motor 42 and the frequency f=4500.38 [Hz] is substantially equal to the frequency of the wind noise generated by the polygon mirror 37. The sound absorption coefficients at these frequencies are respectively 0.77 and 0.73. This means that the noises entering the first resonance space 101 and the second resonance space 102 are respectively absorbed 77% and 73%. Note that the conditions for the calculation of the sound absorption coefficient $\alpha(2\pi f)$ are as follows: the speed of sound c=340.29 [m/sec], the viscosity coefficient of air $\eta=1.8\times10^{-5}$ [Pa·s], and the volume density of air $\rho=1.293$ [kg/m3].

Providing a coupled Helmholtz resonator as in this embodiment needs a reduced resonance space volume as compared with providing two single-type Helmholtz resonators, for example, as described in Japanese Unexamined Patent Application Publication No. 2015-225100. This is described below.

First, the resonance frequency of the resonance space of a single-type Helmholtz resonator is represented by Equation 18 below.

$$f = \frac{C}{2\pi}\sqrt{\frac{S}{V(L+\delta)}} \qquad \text{[Equation 18]}$$

In Equation 18, S is a cross-sectional area of the neck, L is a length of the neck, $\delta$ is an open-end correction value, V is a volume of the resonance space, and C is a speed of sound.

FIGS. 9 and 10 respectively show values for design specifications for causing single-type Helmholtz resonators to absorb a noise having a frequency equal to the frequency of the rotational noise generated by the polygon motor 42 and a noise having a frequency equal to the frequency of the wind noise generated by the polygon mirror 37. Equation 14 is used for the opening-end compensation. Further, the values for the design specifications other than the volume V are equal to those in this disclosure.

Turning now to the volume V of the resonance space, the total volume of the first and second resonance spaces 101 and 102 in the sound absorption structure in this embodiment that uses the coupled Helmholtz resonator H is 22080+2604.4=24684.4 [mm3]. On the other hand, the total volume of the resonance spaces of the sound absorption structure in the comparative example above that uses the above-described single-type Helmholtz resonators is 45505.5+1264=46769.5 [mm3]. Thus, the resonance space volume needed in the sound absorption structure in the comparative example is more than twice the resonance space volume needed in the sound absorption structure according to this embodiment. Therefore, the configuration using a coupled Helmholtz resonator H as in this embodiment reduces the needed resonance space volume, which enables the whole optical scanning device 30 to be downsized.

Embodiment 2

Figure 11:
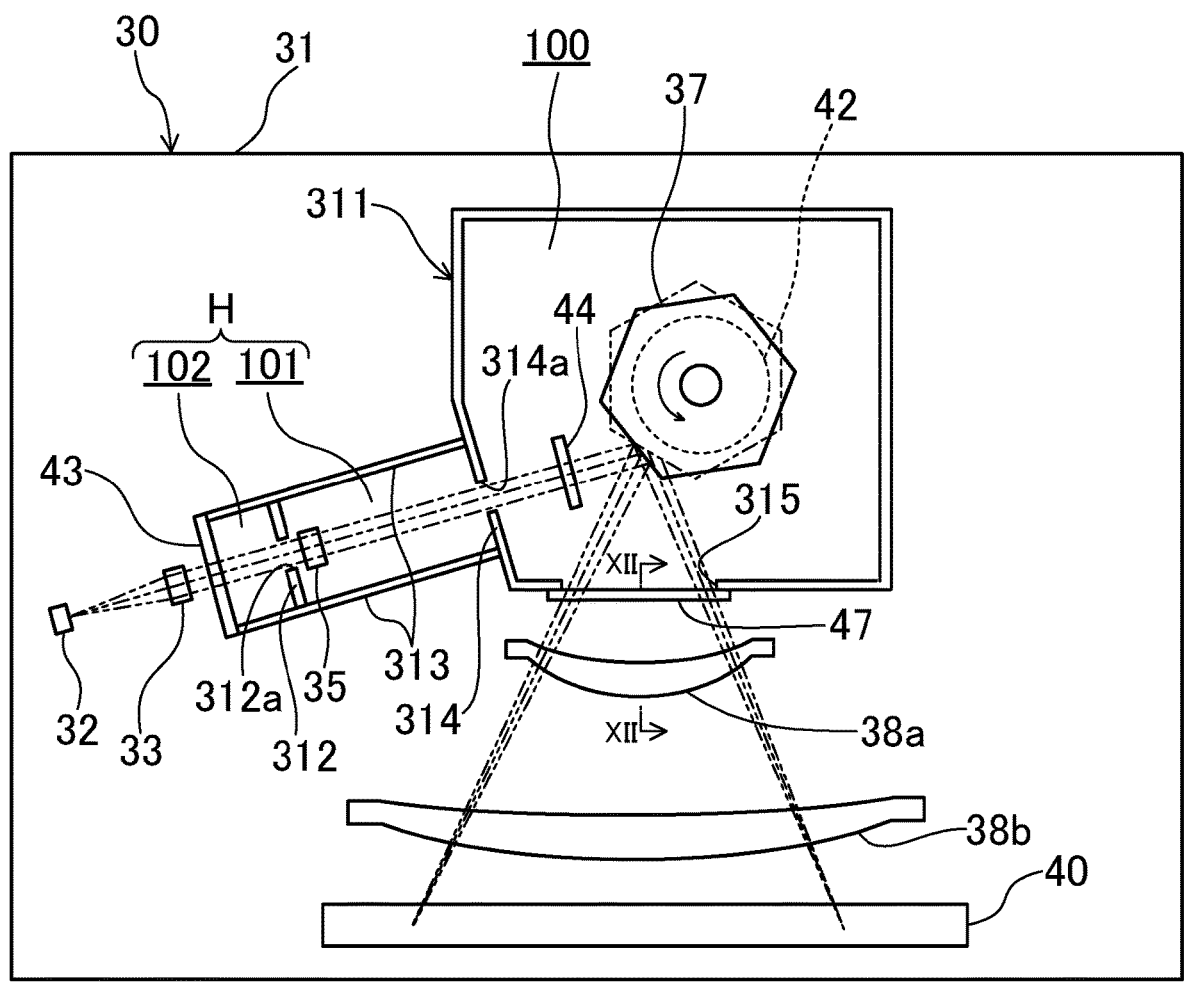
FIG. 11 is a diagram corresponding to FIG. 3 which shows Embodiment 2.
Figure 12:
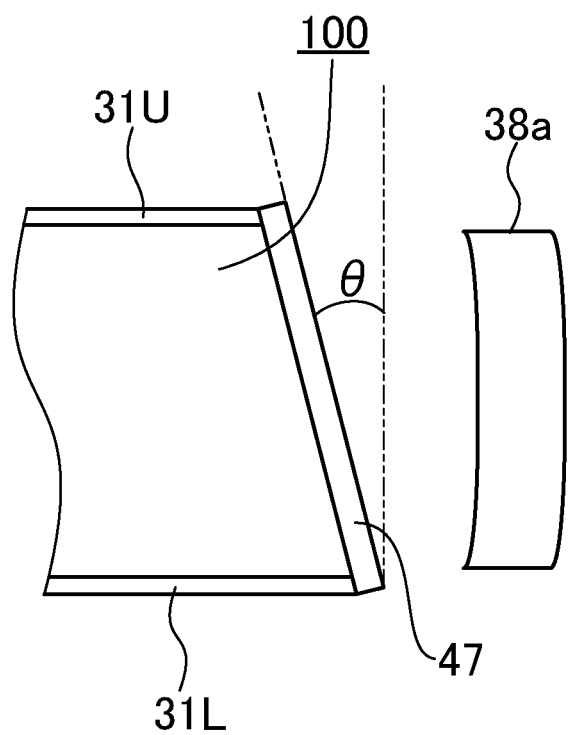
FIG. 12 is a schematic sectional view taken along line XII-XII in FIG. 11.

FIG. 11 is a plan view of an optical scanning device 30 according to Embodiment 2, and FIG. 12 is a cross-sectional view taken along line XII-XII in FIG. 11. Embodiment 2 is different from Embodiment 1 described above in that the space 100 inside the ring-shaped partition wall 311 is sealed.

Specifically, the optical scanning device 30 in this embodiment is configured such that the outgoing opening 315 formed in the ring-shaped partition wall 311 is closed by the transparent plate 47. Thereby, the space 100 inside the ring-shaped partition wall 311 is sealed other than the incoming opening 314a. Note that the entire space consisting of the space 100, the first resonance space 101, and the second resonance space 102 is completely sealed and separated from the outside space where the light source 32 and the first and second image forming lenses 38a and 38b are disposed.

The transparent plate 47 is composed of, for example, a glass plate. As shown in FIG. 12, the transparent plate 47 is inclined at a predetermined angle $\theta$ to the polygon mirror 37 side (outwardly in the radial direction of the polygon mirror 37) from the bottom wall 31L side toward the top wall 31U side with.

[Operational Effects]

The optical scanning device 30 in this embodiment is configured such that the outgoing opening 315 of the ring-shaped partition wall 311 is closed by the transparent plate 47. This configuration prevents acoustic waves generated in the space 100 from leaking out of the ring-shaped partition wall 311 and allows more acoustic waves to enter the incoming opening 314 that is an opening of a resonator. Therefore, this optical scanning device 30 provides a silencing effect more efficiently than an optical scanning device having the space 100 not sealed (having the outgoing opening 315 opened).

Further, since the outgoing opening 315 is closed by the transparent plate 47, a flow of air induced by rotation of the polygon mirror 37 is prevented from being blown directly into the outgoing opening 315, whereby generation of a whistle noise is prevented. Therefore, the second wind blocking plate 46 that is provided in Embodiment 1 is not needed.

Further, the transparent plate 47 is configured to be inclined at a predetermined angle $\theta$ to the polygon mirror 37 side from the bottom wall 31L side toward the top wall 31U side for the same reasons as those for the inclination of the second wind blocking plate 46 in Embodiment 1. This configuration prevents generation of a stray light, thereby preventing formation of a defective image with uneven density or the like.

OTHERS

In the above-described example, Equation 14 is used to calculate the open-end correction value δ. However, the calculation of the open-end correction value is not limited to Equation 14. Depending on the shape of the aperture forming member 312, 314, Equation 13 or Equation 15 may be used.

What is claimed is:

1. An optical scanning device comprising:
a light source emitting a light beam;
a rotary polygonal mirror reflecting the light beam emitted from the light source to deflect and scan the light beam;
an optical housing that houses the rotary polygonal mirror therein;
a motor mounted on a bottom wall of the optical housing and driving the rotary polygonal mirror;
an image forming lens housed in the optical housing and forming an image of the light beam reflected by the rotary polygonal mirror; and
a Helmholtz resonator absorbing sound caused by rotation of the rotary polygonal mirror, wherein
the Helmholtz resonator comprising a coupled Helmholtz resonator having a first resonance space and a second resonance space arranged in series in the optical housing,
the optical scanning device including a translucent partition wall, a first partition wall, and a second partition wall each extending from the bottom wall of the optical housing to a top wall of the optical housing,
the translucent partition wall, the first partition wall, and the second partition wall being arranged in this order from an optical-path upstream side toward an optical-path downstream side on an optical path between the light source and the rotary polygonal mirror,
the first partition wall and the second partition wall each having a light passage opening formed therein through which the light beam passes,
the first partition wall and the second partition wall constituting a part of a wall forming the first resonance space,
the translucent partition wall and the first partition wall constituting a part of a wall forming the second resonance space,
one of the first and second resonance spaces being configured to resonate at a frequency of a rotational speed of the motor, and
another one of the first and second resonance spaces being configured to resonate at a generated frequency of a wind noise generated by the rotary polygonal mirror.

2. The optical scanning device of claim 1, wherein:
the light passage opening of the first partition wall is an opening of an aperture regulating a dimension in a sub-scanning direction of the light beam; and
the light passage opening of the second partition wall is an opening of an aperture regulating a dimension in a main-scanning direction of the light beam.

3. The optical scanning device of claim 1, wherein:
the translucent partition wall is constituted by a glass plate;
a wind blocking plate is provided between the light passage opening of the second partition wall and the rotary polygonal mirror, the wind blocking plate being transparent and blocking a flow of air induced by rotation of the rotary polygonal mirror;
the wind blocking plate is inclined at a predetermined angle outwardly in a radial direction of the rotary polygonal mirror from an optical-housing bottom-wall side toward an optical-path top-wall side; and
the glass plate constituting the translucent partition wall is inclined at an angle equal to the angle at which the wind blocking plate is inclined but in a direction opposite to the direction in which the wind blocking plate is inclined.

4. An image forming apparatus comprising the optical scanning device of claim 1.

* * * * *